United States Patent [19]

Arikawa et al.

[11] 4,420,191

[45] Dec. 13, 1983

[54] SKID CONTROL SYSTEM

[75] Inventors: Tetsuro Arikawa; Teruo Inoue, both of Yokosuka, Japan

[73] Assignee: Nippon Air Brake Co., Ltd., Kobe, Japan

[21] Appl. No.: 250,877

[22] Filed: Apr. 3, 1981

[30] Foreign Application Priority Data

Apr. 7, 1980 [JP] Japan .................................. 55-45523
Jul. 26, 1980 [JP] Japan .................................. 55-102678
Aug. 8, 1980 [JP] Japan .................................. 55-109549

[51] Int. Cl.³ ............................................. B60T 8/02
[52] U.S. Cl. .................................... 303/103; 303/95; 364/426
[58] Field of Search ............................ 303/92, 95–97, 303/105, 106, 111; 364/426

[56] References Cited

U.S. PATENT DOCUMENTS

| 3,972,568 | 8/1976 | Fleischer et al. ................. 303/21 A |
| 4,007,971 | 2/1977 | Sugiura et al. ..................... 303/109 |
| 4,036,536 | 7/1977 | Quon .................................... 303/96 |
| 4,054,329 | 10/1977 | Müller et al. ....................... 303/106 |
| 4,057,299 | 11/1977 | Jones .................................... 303/92 |

Primary Examiner—J. V. Truhe
Assistant Examiner—Saul M. Bergmann
Attorney, Agent, or Firm—McDougall, Hersh & Scott

[57] ABSTRACT

A skid control system for a vehicle having two or more wheels and the respective brakes for the wheels, includes two or more skid control circuits, each of which includes a wheel speed sensor for providing an output signal representative of the speed of the wheel or the mean speed of the wheels, an approximate vehicle speed generator for providing an output signal representative of the approximate speed of the vehicle on the basis of the output signal of the wheel speed sensor, a slip signal generator receiving the output signal of the wheel speed sensor, an acceleration/deceleration signal generator receiving the output signal of the wheel speed sensor, a valve control circuit receiving the outputs of the slip signal generator and acceleration/deceleration signal generator, and electromagnetic inlet and outlet valves receiving the output of the valve control circuit. The maximum of the outputs of the approximate vehicle speed generators of the skid control circuits is supplied to the respective slip signal generators, two predetermined amounts are set in the respective slip signal generators, and a slip signal for relieving the brake to the wheel is generated from the slip signal generator, when the speed of the corresponding wheel becomes lower by more than either of the two predetermined amounts than the maximum output of the approximate vehicle speed generators. The larger of the two predetermined amounts is selected in the respective slip signal generators, until skid signals representative of the skid condition of the wheels occur in all of the skid control circuits, or in the slip signal generator of any one of the skid control circuits, until a skid signal or skid signals representative of the skid condition of the wheel or wheels occurs in the other of the skid control circuits.

14 Claims, 14 Drawing Figures

SKID CONTROL SYSTEM

BACKGROUND OF THE INVENTION

1. Field of the Invention

This invention relates to a skid control system for a vehicle having two or more wheels and the respective brakes for the wheels, and more particularly to a skid control system which includes two or more skid control circuits, each of which includes a wheel speed sensor for providing an output signal representative of the speed of the wheel or the mean speed of the wheels, an approximate vehicle speed generator for providing an output signal representative of the approximate speed of the vehicle on the basis of the output signal of the wheel speed sensor, a slip signal generator receiving the output signal of the wheel speed sensor, an acceleration/deceleration signal generator receiving the output signal of the wheel speed sensor, a valve control circuit receiving the outputs of the slip signal generator and acceleration/deceleration signal generator, and electromagnetic inlet and outlet valves receiving the output of the valve control circuit, wherein the maximum of the outputs of the approximate vehicle speed generators of the skid control circuits is supplied to the respective slip signal generator, a predetermined amount is set in the respective slip signal generators, and a slip signal for relieving the brake to the wheel is generated from the slip signal generator, when the speed of the corresponding wheel becomes lower by more than the predetermined amount than the maximum output of the approximate vehicle speed generators.

2. Description of the Prior Art

In a conventional skid control system for a vehicle having plural wheels and the respective brakes for the wheels, a wheel speed sensor is associated with the wheel or wheels for detecting the speed of the wheel or the mean speed of the wheels. Approximate vehicle speeds estimating the speed of the vehicle are produced from the detecting outputs of the wheel speed sensors, respectively. The maximum of the approximate vehicle speeds is selected as a common approximate vehicle speed to the wheels. Or an approximate vehicle speed is produced from the maximum of the detecting outputs of the wheel speed sensors. The wheel speeds are compared with thus produced approximate vehicle speed in slip signal generators, respectively. When the wheel speed becomes lower by more than a predetermined amount than the approximate vehicle speed, or when a slip of the wheel speed to the approximate vehicle speed becomes larger than a predetermined value, the slip signal generator generates a slip signal. Acceleration of the wheel and deceleration thereof are produced from the detecting output of the wheel speed sensor. When they become larger than predetermined thresholds, an acceleration signal and a deceleration signal are generated from an acceleration/deceleration signal generator. A control signal for controlling the brake for the wheel is obtained from a valve control circuit on the basis of the slip signal, acceleration signal or deceleration signal.

In the above-described skid control system, the wheel speed is used as the approximate vehicle speed, until the deceleration of the wheel reaches a predetermined level. After that, such a signal that decreases at a predetermined gradient with time, is used as the approximate vehicle speed. The wheel speed at the time when the deceleration of the wheel has reached the predetermined level is equal to the approximate vehicle speed.

When the deceleration of the wheel reaches the predetermined level, a considerable brake is already applied to the wheel. Accordingly, some slip occurs in the wheel. For example, slip of a few or several percentages occurs in the wheel. The approximate vehicle speed is lower by slip of a few or several percentages than the true vehicle seed.

The approximate vehicle speed is produced from the plural wheel speeds. Accordingly, when all of the wheels are uniformly or considerably braked to slip of a few or several percentages, the produced approximate vehicle speed is lower by the value corresponding to the slip than the true vehicle speed. Or when any one of the wheels is not so considerably braked, and the slip of the corresponding wheel is nearly equal to zero, the approximate vehicle speed is nearly equal to the true vehicle speed.

However, in the conventional skid control system, the difference between the approximate vehicle speed and the true vehicle speed is neglected, and the predetermined amount is set in the slip signal generator. When the wheel speed becomes lower by the predetermined amount than the approximate vehicle speed, the slip signal is generated from the slip signal generator. When the predetermined amount in the slip signal generator is determined under the assumption that all of the wheels are uniformly or satisfactorily braked, it is too small for the wheel which is not satisfactorily braked. Before the corresponding wheel is satisfactorily braked, the slip signal is generated from the slip signal generator, and the brake for the corresponding wheel is relieved. On the other hand, when the predetermined amount in the slip signal generator is determined under the assumption that any one of the wheels is not satisfactorily braked, it is too large for the case that all of the wheels are uniformly or satisfactorily braked. As the result, all of the wheels slip too much with respect to the optimum slip.

SUMMARY OF THE INVENTION

Accordingly, it is an object of this invention to provide a skid control system by which the brakes for all of the wheels can be controlled always under the optimum condition.

Another object of this invention is to provide a skid control system by which the braking distance of the vehicle can be reduced more.

In accordance with an aspect of this invention, in a skid control system for a vehicle having two or more wheels and the respective brakes for the wheels, including two or more skid control circuits, each of which comprises a wheel speed sensor for providing an output signal representative of the speed of said wheel or the mean speed of the wheels, an approximate vehicle speed generator for providing an output signal representative of the approximate speed of the vehicle on the basis of the output signal of the wheel speed sensor, a slip signal generator receiving the output signal of the wheel speed sensor, an acceleration/deceleration signal generator receiving the output signal of the wheel speed sensor, a valve control circuit receiving the outputs of the slip signal generator and acceleration/deceleration signal generator, and electromagnetic valve means receiving the output of the valve control circuit, wherein the maximum of the outputs of the approximate vehicle speed generators of the skid control circuits is supplied to the respective slip signal generators, a predetermined amount is set in the respective slip signal generators, and a slip signal for relieving the brake to the wheel is generated from the slip signal generator, when the speed of the corresponding wheel becomes lower by more than the predetermined amount than the maximum output of the approximate vehicle speed generators, the improvement in which a second amount is set in the respective slip signal generators, the slip signal generator generating a second slip signal, when the speed of the corresponding wheel becomes lower by more than the second predetermined amount than the maximum output of the approximate vehicle speed generators, and the larger of the first-mentioned predetermined amount and the second amount is selected in the slip signal generator of any one of the skid control circuits, until a skid signal or skid signals representative of the skid condition of the wheel or wheels occurs in the other of the skid control circuits.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, skid control systems according to embodiments of this invention will be described with reference to the drawings.

Figure 1:
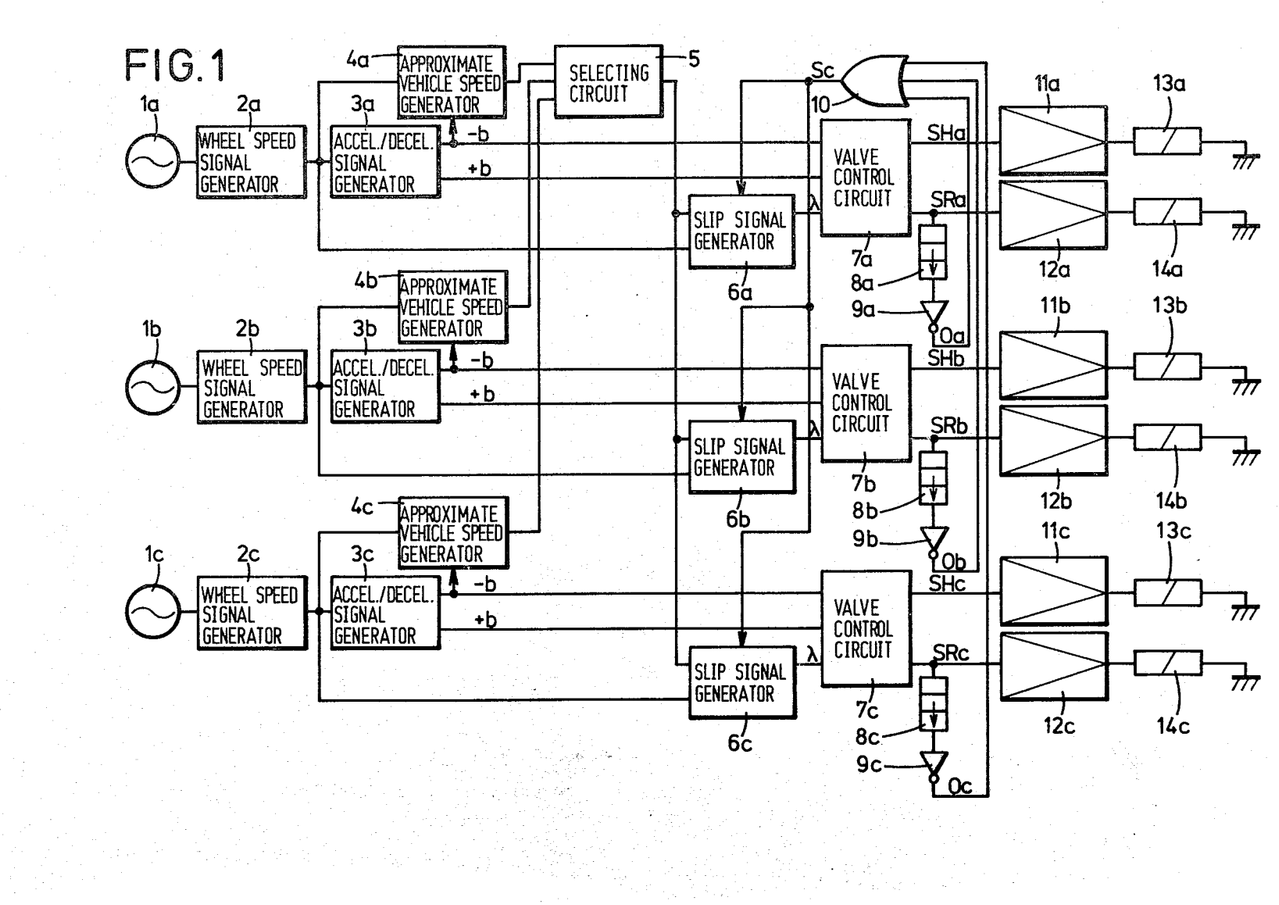
FIG. 1 is a block diagram of a skid control system according to a first embodiment of this invention.

FIG. 1 shows a skid control system according to a first embodiment of this invention. In FIG. 1, wheel speed sensor 1a and 1b are associated with a right front wheel and a left front wheel, respectively. A wheel speed sensor 1c is associated with a drive shaft connected to both rear wheels. The wheel speed sensors 1a and 1b generates pulse signals having frequencies proportional to the rotational speeds of the right and left front wheels, respectively. The wheel speed sensor 1c generates a pulse signal having a frequency proportional to the rotational speed of the drive shaft, and therefore the mean rotational speed of the rear wheels.

The pulse signals of the wheel speed sensors 1a, 1b and 1c are supplied to wheel speed signal generators 2a, 2b and 2c, respectively, to be converted to wheel speed signals Va, Vb and Vc having analogue or digital values proportional to the rotational speeds of the wheels. The wheel speed signals Va, Vb and Vc from the wheel speed signal generators 2a, 2b and 2c are supplied to acceleration/deceleration signal generators 3a, 3b and 3c, approximate vehicle speed generators 4a, 4b and 4c, and slip signal generators 6a, 6b and 6b.

In the acceleration/deceleration signal generators 3a, 3b and 3c, the wheel speed signals Va, Vb and Vc are differentiated with respect to time, and the differentiation results are compared with a predetermined threshold acceleration and a predetermined threshold deceleration. The predetermined threshold acceleration and deceleration are, for example, 0.5 g and −1.5 g, respectively. When the deceleration of the wheel becomes larger than the predetermined threshold deceleration (−1.5 g), a deceleration signal −b is generated from the acceleration/deceleration signal generator 3a, 3b or 3c. When the acceleration of the wheel becomes larger than the predetermined threshold acceleration (0.5 g), an acceleration signal +b is generated from the acceleration/deceleration signal generator 3a, 3b or 3c.

Figure 2:
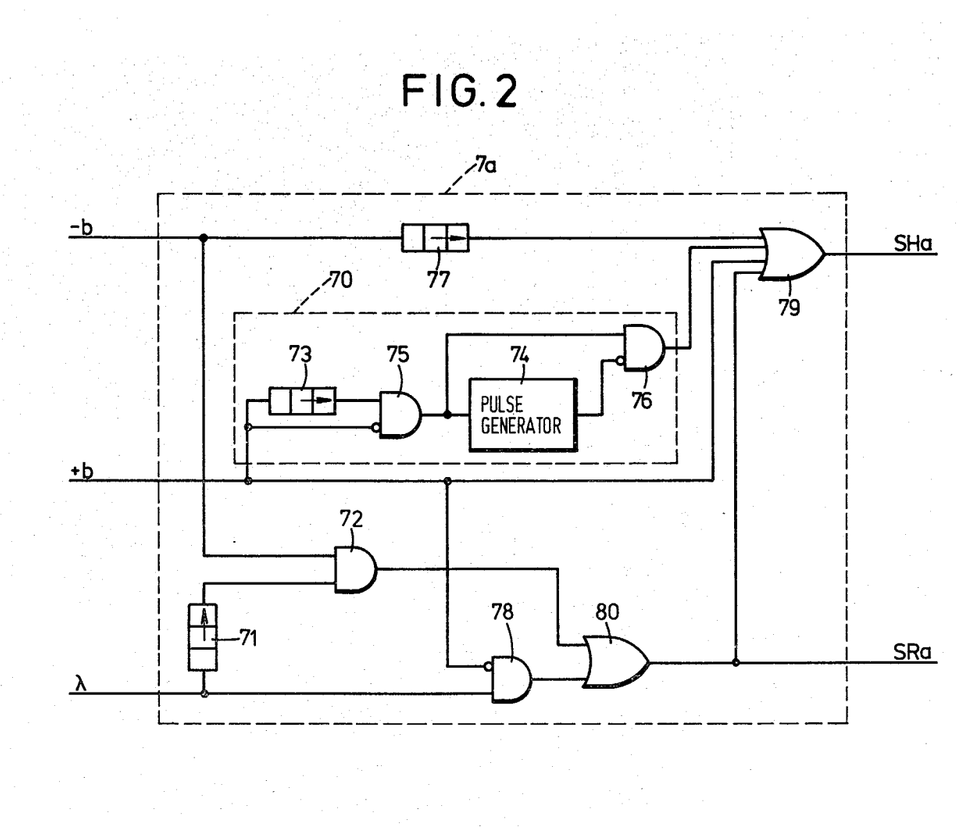
FIG. 2 is a block diagram of a valve control circuit in the skid control system of FIG. 1.

The deceleration signals −b from the acceleration/deceleration signal generators 3a, 3b and 3c are supplied to the approximate vehicle speed generators 4a, 4b and 4c, and to first input terminals of valve control circuits 7a, 7b and 7c, which details are shown in FIG. 2, respectively. The acceleration signals +b from the acceleration/deceleration signal generators 3a, 3b and 3c are supplied to second input terminals of the valve control circuits 7a, 7b and 7c, respectively.

Since the actual speed of the vehicle cannot be conveniently measured directly, the vehicle speed is simultated by the approximate vehicle speed generators 4a, 4b and 4c. Before the deceleration of the wheel on braking reaches the predetermined level which is equal to −1.5 g according to this embodiment, or before the deceleration signal −b is generated from the acceleration/deceleration signal generator 3a, 3b or 3c, the wheel speed signal from the wheel speed signal generator 2a, 2b or 2c is obtained as the approximate vehicle speed, as it is, from the approximate vehicle speed generator 4a, 4b or 4c. However, after the deceleration signal −b is generated from the acceleration/deceleration signal generator 3a, 3b or 3c, such an approximate vehicle speed signal is generated from the approximate vehicle speed signal generator 4a, 4b or 4c that decreases linearly with time at a predetermined gradient, as shown by graph E in FIG. 3A. When the output of the wheel speed signal generator 2a, 2b or 2c becomes higher than the linear approximate vehicle speed signal, the former is obtained as the approximate vehicle speed, as it is from the approximate vehicle speed generator 4a, 4b or 4c.

The outputs of the approximate vehicle speed generators 4a, 4b and 4c are supplied to a selecting circuit 5. The maximum of the outputs of the approximate vehicle speed generators 4a, 4b and 4c is selected by the selecting circuit 5, and it is supplied to the slip signal generators 6a, 6b and 6c, to be compared with the outputs of the wheel speed signal generators 2a, 2b and 2c. Two reference ratios of predetermined amounts are set in the respective slip signal generators 6a, 6b and 6c, and they are changed over by an output of a slip ratio control OR gate 10. The two reference ratios are, for example, 0.15 (15%) and 0.10 (10%) respectively.

Generally, a slip ratio S of the wheel is given by the following formula:

When $$S = 1 - \frac{\text{wheel speed}}{\text{vehicle speed}}$$

When $$\left(1 - \frac{V_a, V_b \text{ or } V_c}{E}\right)$$

is larger than the changed-over one of the two reference ratios, a slip signal λ is generated from the slip signal generator 6a, 6b or 6c, namelythe output of the slip signal generator 6a, 6b or 6c becomes a higher level "1" of two levels "1" and "0". When the output of the OR gate 10 is "1", the larger (15%) of the two reference ratios is selected in the slip signal generator 6a, 6b or 6c. When the output of the OR gate 10 is "0", the smaller of the two reference ratios is selected in the slip signal generator 6a, 6b or 6c. The outputs of the slip signal generators 6a, 6b and 6c are supplied to third input terminals of the valve control circuits 7a, 7b and 7c.

Next, there will be described details of the valve control circuits 7a, 7b and 7c with reference to FIG. 2. Since they are equal to each other in construction, the valve control circuit 7a will be representatively described with reference to FIG. 2.

The deceleration signal −b from the acceleration/deceleration signal generator 3a is supplied to an AND gate 72 and an OFF delay timer 77 (for example, 50–100 milliseconds). An output terminal of the OFF delay timer 77 is connected to a first input terminal of an inlet valve control OR gate 79. The acceleration signal +b from the acceleration/deceleration signal generator 3a is supplied to a brake increase control circuit 70 for gradually increasing the brake, a negation input terminal of an AND gate 78 and a third input terminal of the inlet valve control OR gate 79.

The brake increase control circuit 70 consists of an OFF delay timer 73 (for example, 300–500 milliseconds), a pulse generator 74, and AND gates 75 and 76. The pulse generator 74 generates pulses which are rectangular in shape, and has a predetermined frequency. Pulse signals for step-wisely increasing the brake pressure to the wheel are generated from the brake increase control circuit 70 for the predetermined time of the OFF delay timer 73 after the acceleration signal +b disappears. The pulse signals from the brake increase control circuit 70 are supplied to a second input terminal of the inlet valve control OR gate 79.

The slip signal λ is supplied to an OFF delay timer 71 (for example, 500–1000 milliseconds) and the AND gate 78. An output terminal of the OFF delay timer 71 is connected to another input terminal of the AND gate 72. Outputs of the AND gates 72 and 78 are supplied to an inlet/outlet valve control OR gate 80. The delay time of the OFF delay timer 71 is longer than the time between the first slip signal λ after the start of the braking operation and the next slip signal λ, in the normal skid control operation. In other words, the output of the OFF delay timer 71 is maintained as "1" for a longer time than the time between the first slip signal λ and the next slip signal λ, after the first slip signal λ disappears. The OFF delay timer 71 and the AND gate 72 constitutes such a judge circuit that a first brake relieving signal is formed by the slip signal λ, and following brake relieving signals are formed by either of the slip signal λ and deceleration signal −b. The danger that the brake is relieved before the brake is sufficiently applied, can be avoided by the above-described judge circuit, since the deceleration signal −b is liable to occur as noise due to the unevenness or bumpiness of the road during the initial transient state of the wheel after the start of the braking operation. The slip signal λ is not generated, until the wheel is sufficiently braked. Accordingly, the first brake relieving signal is formed by the slip signal λ.

Referring to FIG. 1, the output signals SHa, SHb and SHc of the inlet valve control OR gates 79 of the valve control circuits 7a, 7b and 7c are supplied through amplifiers 11a, 11b and 11c to solenoid portions 13a, 13b and 13c of not-shown electromagnetic inlet valves. The output signals SRa, SRb and SRc of the inlet/outlet valve control OR gates 80 of the valve control circuits 7a, 7b and 7c are supplied through amplifiers 12a 12b and 12c to solenoid portions 14a, 14b and 14c of not-shown electromagnetic outlet valves. Although not shown, the inlet valve and outlet valve, arranged between a master cylinder and a wheel cylinder mounted on the wheel, have well-known construction. When both of the solenoid portions 13a, 13b or 13c and 14a, 14b or 14c are not energized, or when the output signals SHa, SHb or SHc, and SRa, SRb or SRc of the OR gates 79 and 80 are "0," the inlet and outlet valves make the master cylinder communicate with the wheel cylinder on the wheel to increase the brake pressure to the wheel cylinder. When both of the solenoid portions 13a, 13b or 13c and 14a, 14b or 14c are energized, or when the output signals SHa, SHb or SHc, and SRa, SRb or SRc are "1", the brake pressure to the wheel cylinder is decreased by function of the inlet and outlet valves. And when only the solenoid portion 13a, 13b or 13c of the inlet valve is energized, or when the output signal SHa, SHb or SHc is "1", and the other output signal SRa, SRb or SRc is "0", the brake pressure to the wheel cylinder is maintained constant by function of the inlet and outlet valves.

As shown in FIG. 1 and FIG. 2, the OR gates 80 are further connected to OFF delay timers 8a, 8b and 8c as discriminators. Output terminals of the OFF delay timers 8a, 8b and 8c are connected to NOT gates 9a, 9b and 9c, respectively. Output terminals of the NOT gates 9a, 9b and 9c are connected to input terminals of the slip ratio control OR gate 10. An output terminal of the OR gate 10 is connected to the slip signal generators 6a, 6b and 6c. The delay time of the OFF delay timer 8a, 8b or 8c is so long (for example, 500–1000 milliseconds) that the output of the OFF delay timer 8a, 8b or 8c is maintained as "1" during the skid control operation after the output signal SRa, SRb or SRc of the OR gate 80 becomes "1". Thus, the OFF delay timer 8a, 8b or 8c discriminates whether the wheel is skid-controlled or not.

Next, there will be described operation of the above-described skid control system.

Figure 3A:
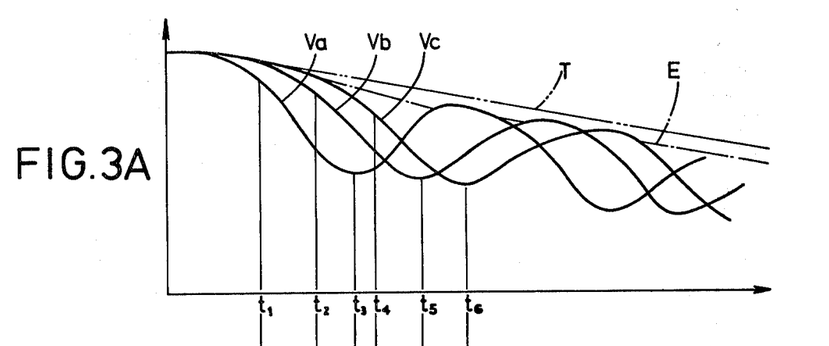
FIG. 3A to FIG. 3D are graphical illustrations of the performance of the skid control system of FIG. 1.

The master cylinder (not shown) is actuated by treading a not-shown brake pedal. It is here assumed that the output signals Va, Vb and Vc of the wheel speed signal generators 2a, 2b and 2c are changing with time as shown in FIG. 3A due to some difference between the characteristics of the brakes for the wheels, and the frictional coefficients of the wheels and road. The approximate vehicle speed signal E is generated from the selecting circuit 5, as shown by the dot-dash line in FIG. 3A. In FIG. 3A, the true vehicle speed T is represented by the two-dot dash line. As above-described, the approximate vehicle speed signal E is the maximum of the output signals of the approximate vehicle speed generators 4a, 4b and 4c. When any of the output signals of the wheel speed signal generators 2a, 2b and 2c is higher than the linearly produced approximate vehicle speed signal, the former is obtained as the approximate vehicle speed signal E from the selecting circuit 5. Accordingly, the approximate vehicle speed signal E does not linearly change with time during some time intervals, as shown in FIG. 3A, and it coincides with the corresponding one of the wheel speed signals Va, Vb and Vc during the above time intervals.

Immediately after the start of the braking operation, or before time $t_1$, sufficient brake is not yet applied to all of the wheels. None of the deceleration signal −b and the slip signal λ are generated from the acceleration/deceleration signal generators 3a, 3b and 3c and slip signal generators 6a, 6b and 6c. Accordingly, the output signals SHa, SHb, SHc, SRa, SRb and SRc of the OR gates 79 and 80 of the valve control circuits 7a, 7b and 7c are "0" before time $t_1$, and none of the solenoid portions 13a, 13b and 13c of the inlet valves, and of the solenoid portions 14a, 14b and 14c of the outlet valves are energized. Thus, the brake pressure to the wheel cylinder of the wheel is increased with time.

Figure 3B:
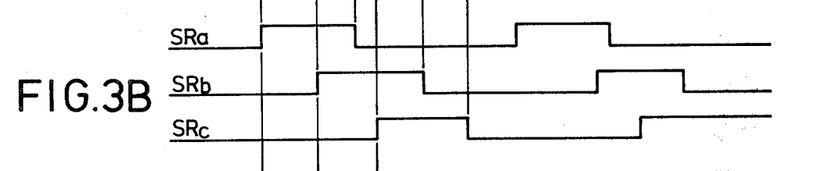

At time $t_1$, the slip ratio of the right front wheel speed Va to the approximate vehicle speed E reaches 15% which is the larger of the predetermined amounts set in the slip signal generator 6a. The slip signal λ is generated from the slip signal generator 6a, and therefore the output signal SRa is obtained from the valve control circuit 7a, as shown in FIG. 3B.

As shown in FIG. 2, the slip signal λ is supplied to the OFF delay timer 71 and the AND gate 78 in the valve control circuit 7a. The OR gate 80 generates the signal SRa. It is supplied to the fourth input terminal of the OR gate 79. Accordingly, the other signal SHa is obtained from the OR gate 79. The solenoid portions 13a and 14a of the inlet and outlet valves are energized with the signals SRa and SHa. Thus, the brake pressure to the wheel cylinder of the right front wheel is lowered with time after the time $t_1$.

Figure 3C:
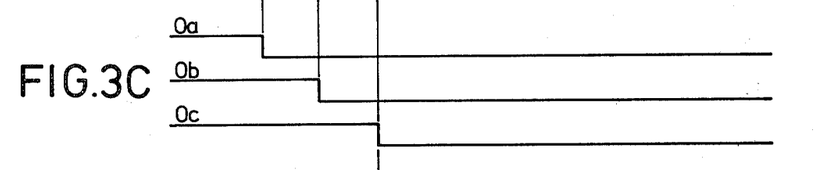
Figure 3D:
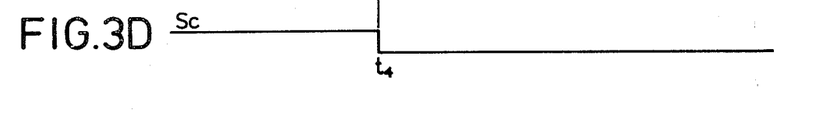

On the other hand, the output signal SRa of the OR gate 80 is supplied to the OFF delay timer 8a. The output of the OFF delay timer 8a becomes "1". Accordingly, the output 0a of the NOT gate 9a becomes "0", as shown in FIG. 3C. The slip signal λ is not still generated from the slip signal generators 6b and 6c. Therefore, the signals SRb and SRc are not still generated from the OR gates 80 in the valve control circuits 7b and 7c. The outputs 0b and 0c of the NOT gates 9b and 9c remain "1", as shown in FIG. 3C. Accordingly, the output Sc of the slip ratio control OR gate 10 remains "1", as shown in FIG. 3D, and the larger (15%) of the predetermined amounts remains selected in the slip signal generators 6a, 6b and 6c. As above described, the delay times of the OFF delay timers 8a, 8b and 8c are sufficiently long. Once the output of the OFF delay timer 8a, 8b or 8c becomes "1", it is maintained as "1" during the skid control operation.

Meanwhile, at time $t_2$, the slip ratio of the left front wheel speed Vb to the approximate vehicle speed E reaches the slip ratio of 15%. The slip signal λ is generated from the slip signal generator 6b. The output signal SRb is obtained from the valve control circuit 7b, as shown in FIG. 3B. At the same time, the output signal SHb is obtained from the valve control circuit 7b. The brake pressure to the wheel cylinder of the left front wheel starts to be decreased. On the other hand, the output signal SRb is supplied to the OFF delay timer 8b. The output 0b of the NOT gate 9b becomes "0", as shown in FIG. 3C. However, the slip signal λ is still not generated from the slip signal generator 6c. The output 0c of the NOT gate 9c remains "1". Thus, the output Sc of the slip ratio control OR gate 10 remains "1". As the result, the larger of the predetermined amounts remains selected in the slip signal generators 6a, 6b and 6c.

Meanwhile, the wheel speed Va of the wheel relieved from braking is so recovered that the acceleration of the wheel reaches the predetermined threshold acceleration (0.5 g) at time $t_3$. The acceleration signal +b is generated from the acceleration/deceleration signal generator 3a, and it is supplied to the negation input terminal of the AND gate 78 in the valve control circuit 7a. The output SRa of the OR gate 80 becomes lower as "0" at time $t_3$, as shown in FIG. 3B. On the other hand, the acceleration signal +b is supplied to the third input terminal of the OR gate 79. Accordingly, the output SHa of the OR gate 79 remains "1". Now, the brake pressure to the right front wheel being controlled by the output signals SHa and SRa is maintained at the reduced brake pressure. Although the output signal SRa is "0", the output of the OFF delay timer 8a remains "1". Therefore, the output 0a of the NOT gate 9a remains "1".

At time $t_4$, the slip ratio of the wheel speed Vc of the rear wheels hardest to be braked to the approximate vehicle speed E reaches the larger (15%) of the predetermined amounts. The output signal SRc as shown in FIG. 3B is generated from the valve control circuit 7c. At the same time, the output signal SHc is generated from the valve control circuit 7c. Now, the brake pressure to the wheel cylinders of the rear wheels is decreased with time. On the other hand, the output signal SRc is supplied to the OFF delay timer 8c. The output 0c of the NOT gate 9c becomes "0", as shown in FIG. 3C. Now, all of the signals supplied to the input terminals of the slip ratio control OR gate 10 become "0". Accordingly, the output Sc of the OR gate 10 becomes "0", as shown in FIG. 3D. Now, the slip signal generators 7a, 7b and 7c are changed over into the smaller (10%) of the predetermined amounts. The delay times of the OFF delay times 8a, 8b and 8c are sufficiently long. Although all of the signals SRa, SRb and SRc or any one thereof disappears hereafter, the output Sc of the slip ratio control OR gate 10 is maintained at the lower level "0" during the skid control operation. Accordingly, the smaller (10%) of the predetermined amounts remains selected in the slip signal generators 6a, 6b and 6c hereafter.

As above described, the brake pressures to the wheel cylinders of the wheels start to be decreased at the time $t_1$, $t_2$ and $t_4$, respectively. The wheel speeds Va, Vb and Vc are so recovered that the output signals SRa, SRb, and SRc becomes "0" at times $t_3$, $t_5$ and $t_6$. Since the delay times of the OFF delay timers 8a, 8b and 8c are sufficiently long, the output Sc of the OR gate 10 is maintained at the lower level "0" also hereafter. After the smaller of the predetermined amounts is selected in the slip signal generators 6a, 6b and 6c, the slip signal λ disappears from the slip signal generators 6b and 6c.

During the skid control operation, when the deceleration signal −b is generated after the first slip signal λ is generated, the output signals SHa, SHb, SHc and SRa, SRb, SRc from the valve control circuits 7a, 7b and 7c becomes "1", since the output "1" of the OFF delay timer 71 is already supplied to the one input terminal of the AND gate 72. Thus, the brake pressure to the wheel cylinder of the wheel is lowered with deceleration signal −b, after the first slip signal λ is generated.

When the deceleration signal −b is generated before the first slip signal λ, the brake pressure to the wheel cylinder of the corresponding wheel is changed over from the increasing state into the constant state, and it is maintained at the increased brake pressure. The deceleration signal −b is supplied through the OFF delay timer 77 to the OR gate 79. The output signal SHa, SHb or SHc from the valve control circuit 7a, 7b or 7c becomes "1", while the output signal SRa, SRb or SRc remains "0". Only the solenoid portion 13a, 13b or 13c of the inlet valve is energized to maintain the brake pressure to the wheel cylinder of the corresponding wheel at the increased brake pressure. If the brake pressure is increased immediately after disappearance of the deceleration signal −b, there is a risk of the corresponding wheel being braked too much into the locked condition. For avoiding the risk, the deceleration signal −b is supplied through the OFF delay timer 77 to the OR gate 79, not directly to the OR gate 79. Accordingly, the brake pressure to the wheel cylinder of the corresponding wheel is maintained at the increased brake pressure for the delay time of the OFF delay timer 77, not increased. The delay time of the OFF delay timer 77 is so determined; avoid the above-described risk.

As already described with respect to the right front wheel, the acceleration signal +b is generated, when the brake pressure to the wheel cylinder of the wheel is so lowered that the acceleration of the wheel reaches the predetermined threshold acceleration. As shown in FIG. 3B, the output signals SRa, SRb and SRc from the valve control circuits 7a, 7b and 7c becomes "0" at the times t3, t5 and t6 when the acceleration of the wheel reaches the predetermined threshold acceleration. In the valve control circuit 7a, 7b or 7c, the acceleration signal +b is supplied to the OR gate 79 to energize the solenoid portion 13a, 13b or 13c of the inlet valve. Thus, the brake pressure to the wheel cylinder of the corresponding wheel is maintained at the reduced brake pressure.

When the acceleration of the wheel becomes lower than the predetermined threshold acceleration, the acceleration signal +b disappears. The pulse signal for stepwisely increasing the brake pressure is generated with the disappearance of the acceleration signal +b from the brake increase control circuit 70 constituted by the OFF delay timer 73, the pulse generator 74 and the AND gates 75 and 76. It is obtained as the output signal SHa, SHb or SHc from the valve control circuit 7a, 7b or 7c.

The output of the OFF delay timer 73 is maintained at the higher level "1" for the predetermined delay time after the acceleration signal +b disappears. The acceleration signal +b has been supplied to the negation input terminal of the AND gate 75. As son as the acceleration signal +b disappears, the output of the AND gate 75 becomes "1", and it is supplied to the input terminal of the other AND gate 76,. The pulse of the pulse generator 74 is supplied to the other input terminal of the AND gate 76. The pulse signal synchronized with the pulse of the pulse generator 74 is obtained as the output signal SHa, SHb or SHc from the AND gate 76, and it is supplied through the OR gate 79 to the solenoid portion 13a, 13b or 13c of the inlet valve to intermittently energize the latter. Thus, the brake pressure to the wheel cylinder of the wheel is stepwisely increased. Meanwhile, the deceleration signal −b or the slip signal λ is generated from the acceleration/deceleration signal generator 3a, 3b or 3c. The output of the OFF delay timer 73 remains "1". The output signal SHa, SHb or SHc becomes the continuous high level "1" signal from the intermittent high level "1" signal. The other output signal SRa, SRb or SRc becomes "1". Thus, the brake pressure to the wheel cylinder of the corresponding wheel starts to be decreased. Hereafter, the brake pressure is, repeatedly, maintained at constant, stepwisely increased, and decreased in accordance with the acceleration signal +b, the deceleration signal −b, and the slip signal λ. Meanwhile, the vehicle reaches the desired speed, or it stops. Thus, the skid control ends.

According to this embodiment, the larger (15%) of the two reference slip ratios is selected in the respective slip generators 6a, 6b and 6c, immediately after the start of the braking operation. The output of the selecting circuit 5 is the maximum of the outputs of the approximate vehicle speed generators 4a, 4b and 4c, which is the output of the approximate vehicle speed generator 4c formed on the basis of the wheel speed Vc of the wheel hardest to be braked in FIG. 3A. Thus, the proper slip signal λ, and therefore the proper brake relieving signal (SHa, SHb, SHc is "1", SRa, SRb, SRc is "1") are obtained for all of the wheels. And the slip signal generators 6a, 6b and 6c are changed over into the smaller (10%) of the two reference slip ratios at the time t4 when all of the wheels have been properly braked, or when all of the wheels have satisfactorily slipped. Thus, the proper brake relieving signal is always obtained for all of the wheels during the skid control operation.

If all of the wheels are uniformly braked, the slip signals λ are generated from the slip signal generators 6a, 6b and 6c substantially at the same time to put the output of the OR gate into the lower state "0", and changeover the slip signal generators 6a, 6b and 6c into the smaller of the two reference slip ratios.

When all of the wheels or any one of them are or is not sufficiently braked, or when the approximate vehicle speed E is nearly equal to the true vehicle speed T, the larger of the two reference ratios is selected in the respective slip signal generators 6a, 6b and 6c. The smaller of the two reference ratios is selected in the slip signal generators 6a, 6b 6c after the time when all of the wheels have been sufficiently braked, or when the approximate vehicle speed E becomes considerably lower than the true vehicle speed T. Thus, all of the wheels are so controlled as to be always on the optimum slip condition. The braking distance can be more reduced in comparison with the prior art skid control system.

Figure 4:
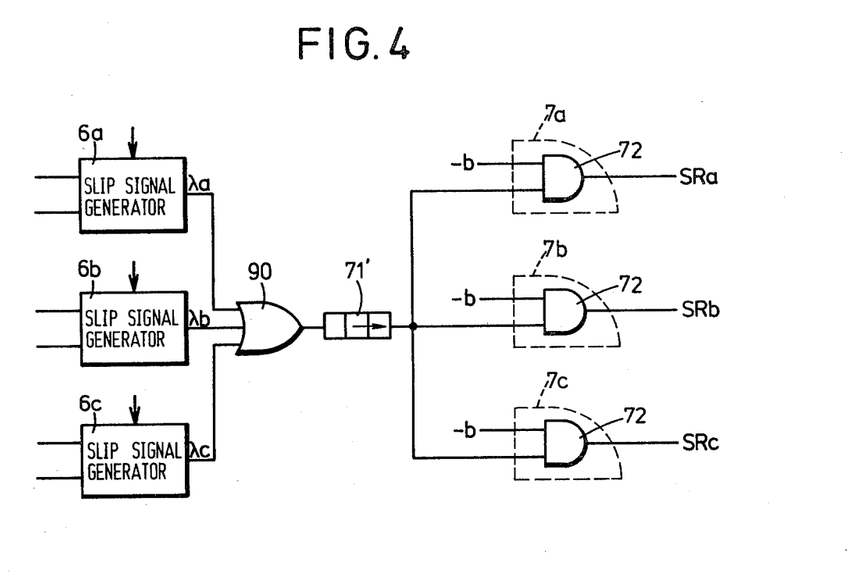
FIG. 4 is a block diagram of a part of one modification of the skid control system of FIG. 1.

FIG. 4 shows one modification of the skid control system of FIG. 1. In this modification, the output terminals of the slip signal generators 6a, 6b and 6c are connected to an OR gate 90. An output terminal of the OR gate 90 is connected to a common OFF delay timer 71' which corresponds to the OFF delay timers 71 in the skid control system of FIG. 1. An output terminal of the common OFF delay timer 71' is connected to the one input terminals of the AND gates 72 in the valve control circuits 7a, 7b and 7c. The outputs of the AND gates 72 correspond to the above described signals SRa, SRb and SRc. Accordingly, the OFF delay timers 71, the AND gates 78 and the OR gates 80 in the skid control system of FIG. 1 are omitted from this modification.

In FIG. 4, when the slip signal λa, λb or λc is generated from any one of the slip signal generators 6a, 6b and 6c, the AND gates 72 in the valve control circuits 7a, 7b and 7c become conductive for the deceleration signal −b. When the deceleration of the wheel becomes higher than the predetermined threshold deceleration, the signal SRa, SRb or SRc for relieving the brake pressure to the corresponding wheel is obtained from the AND gate 72 in the corresponding valve control circuit 7a, 7b or 7c. The signals SRa, SRb and SRc are supplied, although not shown in FIG. 4, to the OFF delay timers 8a, 8b and 8c shown in FIG. 1. After any one of the slip signal λa, λb and λb is generated from the corresponding one of the slip signal generators 6a, 6b and 6c, the smaller of the two reference slip ratios is selected in the slip signal generators 6a, 6b and 6c at the time when all of the decelerations of the wheels reach the predetermined threshold deceleration.

In FIG. 4, the slip signal generators 6a, 6b and 6c are not changed over into the smaller of the two reference slip ratios, unless the slip signals λa, λb or λc is first generated from any one of the slip signal generators 6a, 6b and 6c. Even when the deceleration signal −b is generated as noise from all of the wheels before the wheels are sufficiently braked, the brake relieving signal is not generated. Unless the slip ratio of at least one of the wheels becomes higher than the larger of the two reference slip ratios, the brake relieving signal is not generated. Thus, a stable skid control operation is secured. In this modification, it is considered that, when the slip ratio of at least one of the wheels becomes higher than the larger of the two reference slip ratios, the other of the wheels are considerably braked.

Figure 5:
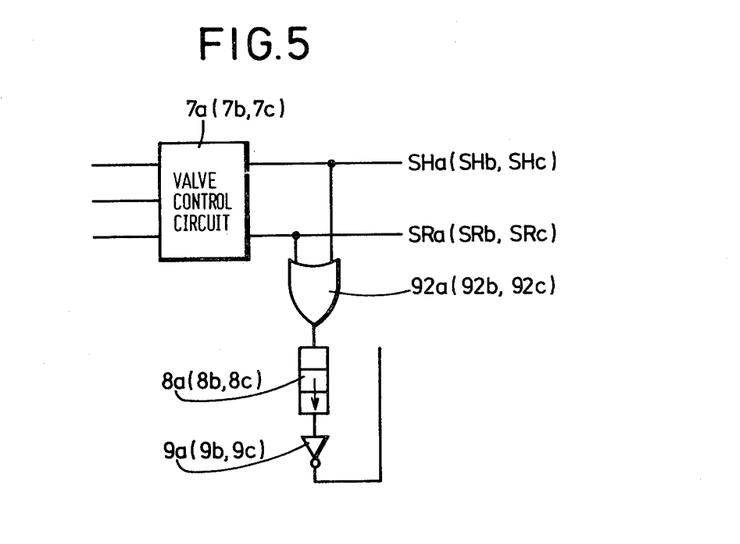
FIG. 5 is a block diagram of a part of another modification of the skid control system of FIG. 1.

FIG. 5 shows another modification of the skid control system of FIG. 1. In this modification, the output signals SHa, SHb, SHc and SRa, SRb, SRc from the valve control circuits 7a, 7b and 7c are supplied to OR gates 92a, 92b and 92c, respectively. Outputs of the OR gates 92a, 92b and 92c are supplied to the OFF delay timers 8a, 8b and 8c. Referring to FIG. 2, the output terminal of the OR gate 79 in the valve control circuit 7a, 7b or 7c is connected to one input terminal of the newly arranged OR gate 92a, 92b or 92c, and the output terminal of the other OR gate 80 is connected to another input terminal of the newly arranged OR gate 92a, 92b or 92c. In this modification, the slip signal generators 6a, 6b and 6c are changed-over into the smaller of the two reference slip ratios on the basis of the first generated one of the slip signal λ and deceleration signal −b. Substantially the same effect as the embodiment of FIG. 1 can be obtained by this modification.

Figure 6:
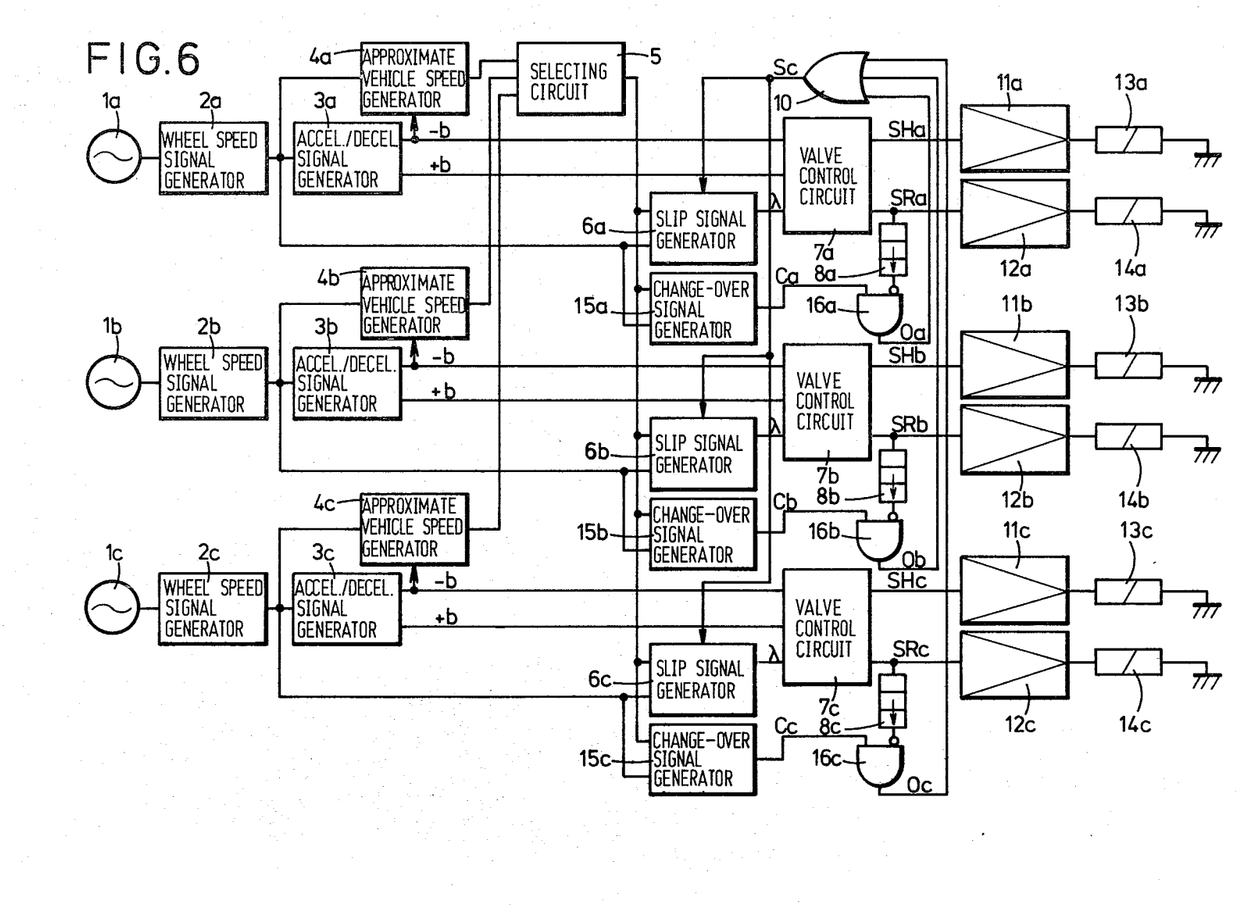
FIG. 6 is a block diagram of a skid control system according to a second embodiment of this invention.

FIG. 6 shows a skid control system according to a second embodiment of this invention. Parts in FIG. 6 which correspond to those in FIG. 1, are denoted by the same reference numerals, the description of which will be omitted.

In this embodiment, change-over signal generators 15a, 15b and 15c are provided in contrast to the skid control system of FIG. 1. And AND gates 16a, 16b and 16c are provided instead of the NOT gates 9a, 9b and 9c. The output terminal of the selecting circuit 5 is connected to the respective one input terminals of the change-over signal generators 15a, 15b and 15c. Further, the output terminals of the wheel speed signal generators 2a, 2b and 2c are connected to the other input terminals of the change-over signal generators 15a, 15b and 15c, respectively. Output terminals of the change-over signal generators 15a, 15b and 15c are connected to one input terminals of the AND gates 16a, 16b and 16c, respectively. The output terminals of the OFF delay timers 8a, 8b and 8c are connected to the other negation input terminals of the AND gates 16a, 16b and 16c.

A predetermined slip ratio of slip value is set in the respective change-over signal generators 15a, 15b and 15c. It is smaller than the two reference slip ratio or slip value set in the slip signal generators 6a, 6b and 6c. For example, the predetermined slip value in the change-over signal generators 15a, 15b, and 15c is 5 km/hour which will be denoted by $\Delta V$. Or it may be 5%. The output of the selecting circuit 5 which will be denoted here by Vn, or the maximum of the outputs of the approximate vehicle speed generators 4a, 4b and 4c is compared with the outputs of the wheel speed signal generators 2a, 2b and 2c in the respective change-over signal generators 15a, 15b and 15c. When the output Va, Vb or Vc of the wheel speed signal generator 2a, 2b or 2c becomes lower by more than $\Delta V$ than the output of the selecting circuit 5, the change-over signal generator 15a, 15b or 15c generates a negative-going output which level is "0". When the difference between the output Va, Vb or Vc of the wheel speed signal generator 2a, 2b or 2c and the output Vn of the selecting circuit 5 is smaller than $\Delta V$, the level of the output of the change-over signal generator 15a, 15b or 15c is "1". The change-over signal generators 15a, 15b and 15c judge that the wheels are considerably braked. On the other hand, the slip signal generators 6a, 6b and 6c judge that the wheel are braked too much for the optimum brake control.

Next, there will be described operation of the skid control system of FIG. 6 with reference to FIG. 6 and FIG. 7A to FIG. 7C.

Figure 7A:
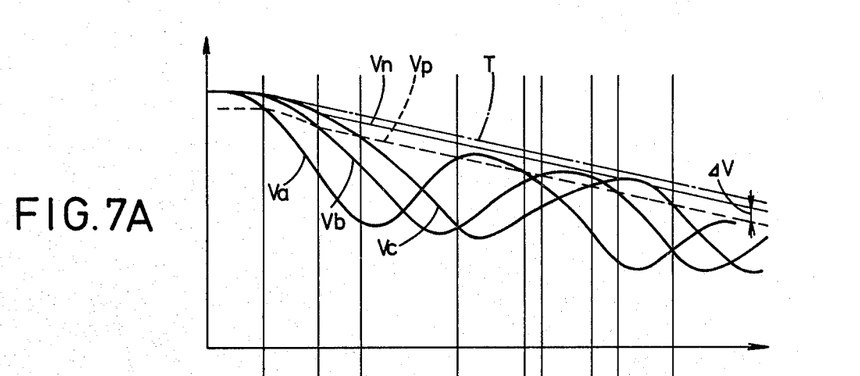
FIG. 7A to FIG. 7C are graphical illustrations of the performance of the skid control system of FIG. 6.
Figure 7B:
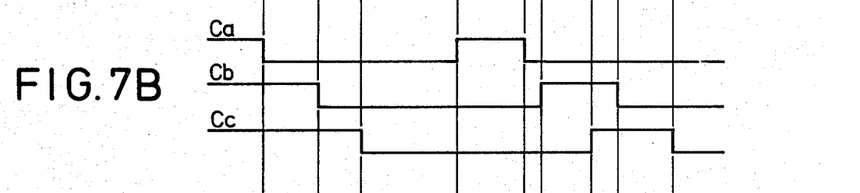
Figure 7C:
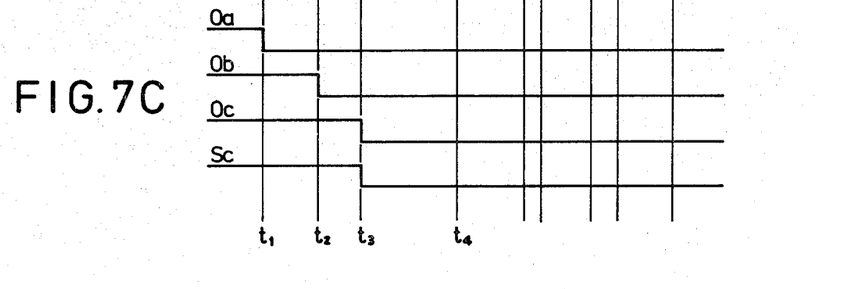

The wheels speeds Va, Vb and Vc are assumed to change with time in the manner shown in FIG. 7A by treading the brake pedal. in FIG. 7A, the line Vn represents the approximate vehicle speed which corresponds to the line E in FIG. 3A. The dashed line Vp represents $(Vn - \Delta V)$. Immediately after the start of the braking operation, the wheel speeds Va, Vb and Vc are nearly equal to the approximate vehicle speed Vn. Meanwhile, at time $t_1$, the speed Va of the right front wheel becomes lower by $\Delta V$ than the approximate vehicle speed Vn. Or it becomes lower than the dashed line Vp. A negative-going pulse signal Ca is generated from the change-over signal generator 15a, as shown in FIG. 7B. The output Oa of the AND gate 16a becomes "0", as shown in FIG. 7C, since the output SRa is still not generated from the valve control circuit 7a. The output "0" of the AND gate 16a is supplied to the one input terminal of the OR gate 10. However, since change-over signals Cb and Cc are still not generated from the other change-over signal generators 15b and 15c, the outputs "1" of the AND gates 16b and 16c are supplied to the other input terminals of the OR gate 10. Accordingly, the output Sc of the OR gate 10 remain "1", as shown in FIG. 7C, and the larger (15%) of the two reference slip ratios remains selected in the slip signal generators 6a, 6b and 6c.

At time $t_2$, the speed Vb of the left front wheel becomes lower by $\Delta V$ than the approximate vehicle speed Vn. The negative-going pulse Cb is generated from the change-over signal generator 15b, as shown in FIG. 7B.

Accordingly, the output of the AND gate 16b becomes "0". However, since the negative-going pulse Cc is still not generated from the change-over signal generator 15c, the output of the OR gate 10 remains "1", and the larger of the two reference slip ratios remain selected in the slip signal generators 6a, 6b and 6c.

At the time between the times $t_1$ and $t_2$, the slip ratio of the speed Va of the right front wheel to the approximate vehicle speed Vn becomes larger than the larger of the two reference slip ratios, and the slip signal $\lambda$ is generated from the slip signal generator 6a. Thus, the output signals SRa and SHa are obtained from the valve control circuit 7a to energize the solenoid portions 13a and 14a of the inlet and outlet valves. The brake pressure to the right front wheel starts to be decreased from the increased condition. On the other hand, the output signal SRa from the valve control circuit 7a is supplied to the OFF delay timer 8a. The output "" of the OFF delay timer 8a is supplied to the negation input terminal of the AND gate 16a. However, the negative-going pulse Ca is already supplied to the one input terminal of the AND gate 16a. Accordingly, the output of the AND gate 16a does not change with the output signal SRa, and it is "0".

As described with reference to FIG. 1, the delay time of the OFF delay timers 8a, 8b and 8c is sufficiently long. Once the outputs of the OFF delay timers 8a, 8b and 8c become "1", they are maintained at the level "1" during the skid control operation. Accordingly, although the change-over signal Ca disappears at time $t_4$ as shown in FIG. 7B, the output of the AND gate 16a is maintained at the level "0" during the skid control operation.

At time $t_3$, the speed Vc of the rear wheels hardest to be braked becomes lower by $\Delta V$ than the approximate vehicle speed Vn, the negative-going pulse Cc is generated from the change-over signal generator 15c as shown in FIG. 7B. Accordingly, the output Oc of the AND gate 16c becomes "0," as shown in FIG. 7C. Thus, all of the inputs to the OR gate 10 becomes "0". The output Sc of the OR gate 10 becomes "0" from "1," as shown in FIG. 7C. The slip signal generators 6a, 6b and 6c are changed over into the smaller from the larger of the two reference slip ratios.

Before the change-over signals Ca, Cb and Cb disappears, the slip signals $\lambda$ are generated from the slip signal generators 6a, 6b and 6c to maintain the outputs of the AND gates 16a, 16b and 16c at the lower level "0". Thus, the smaller of the two reference slip ratios remains selected hereafter. The other operations are the same as in the skid control system of FIG. 1. Substantially the same effect as in the skid control system of FIG. 1 can be obtained in this embodiment.

The skid control systems of the above embodiments consist of three skid control circuits, each of them includes the wheel speed sensor 1a, 1b or 1c, the wheel speed signal generator 2a, 2b or 2c, the acceleration/deceleration signal generator 3a, 3b or 3c, the approximate vehicle speed generator 4a, 4b or 4c, the slip signal generator 6a, 6b or 6c, the valve control circuit 7a, 7b or 7c and the solenoid portions 13a, 13b or 13c and 14a, 14b or 14c of the inlet and outlet valves.

Figure 8:
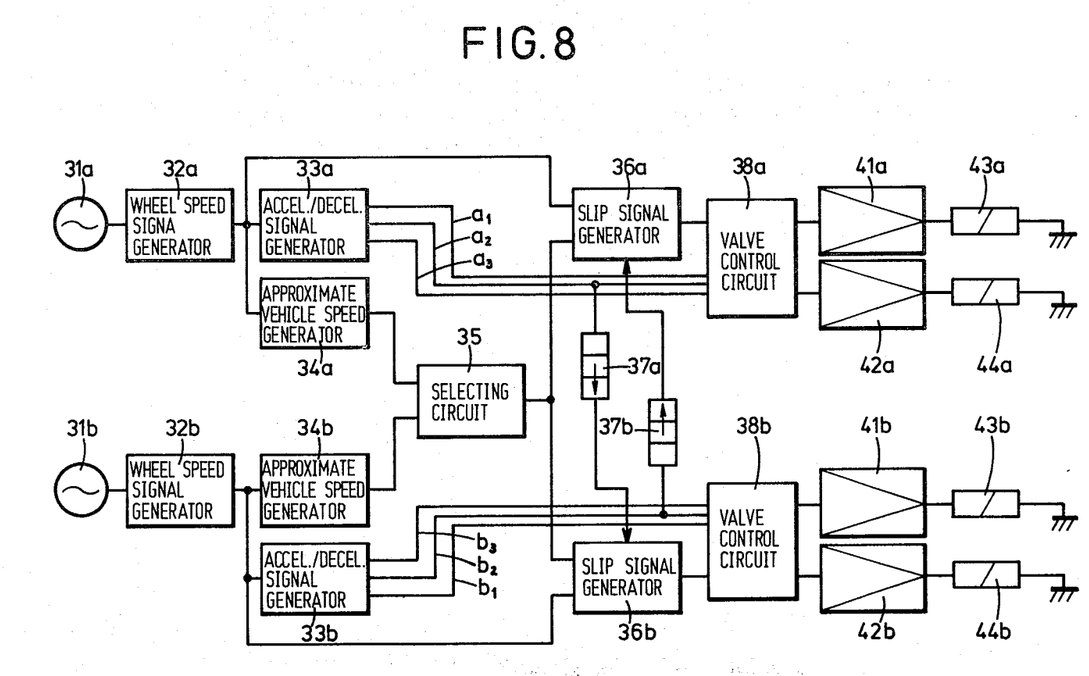
FIG. 8 is a block diagram of a skid control system according to a third embodiment of this invention.

FIG. 8 shows a skid control system according to a third embodiment of this invention which will be applied to a two-wheeled vehicle, or a motor-cycle.

The skid control system according to this embodiment consists of two skid control circuits, each of which includes a wheel speed sensor 31a or 31b associated with a front wheel or rear wheel, a wheel speed signal generator 32a or 32b corresponding to that in FIG. 1, an acceleration/deceleration signal generator 33a or 33b, an approximate vehicle speed generator 34a or 34b corresponding to that in FIG. 1, a slip signal generator 36a or 36b corresponding to that in FIG. 1, a valve control circuit 38a or 38b, an amplifier 41a, 42a or 41b, 42b corresponding to those in FIG. 1, and solenoid portions 43a, 44b or 43b, 44b of inlet and outlet valves corresponding to those in FIG. 1.

Predetermined threshold deceleration such as $-1.5g$, first threshold acceleration such as 0.5 g and second threshold acceleration such as 5.0 g are set in the respective acceleration/deceleration signal generators 33a and 33b. When the deceleration of the wheel becomes higher than the predetermined threshold deceleration, a deceleration signal $a_2$ or $b_2$ is generated from the acceleration/deceleration signal generator 33a or 33b. When the acceleration of the wheel becomes higher than the predetermined first threshold acceleration (0.5g), a first acceleration signal $a_1$ or $b_1$ is generated from the acceleration/deceleration signal generator 33a or 33b. When the acceleration of the wheel becomes higher than the predetermined second threshold acceleration (5.0g), a second acceleration signal $a_3$ or $b_3$ is generated from the acceleration/deceleration signal generator 33a or 33b. The second acceleration signal $a_3$ or $b_3$ is generated in the case that, for example, when the friction coefficient of the road suddenly changes, the acceleration of the wheel increases extraordinarily.

In the normal skid control operation, it is scarcely generated. Accordingly, the second threshold acceleration is not always required. When it is omitted, the valve control circuits 38a and 38b may be equal to those in FIG. 1 in construction.

In this embodiment, an OFF delay timer 37a for example, 500–1000 milliseconds is connected to the second output terminal from which the deceleration signal $a_2$ is obtained. An output terminal of the OFF delay timer 37a is connected to the slip signal generator 36b to select the one of the two reference slip ratios set in it. A similar OFF delay timer 37b is connected to the second output terminal from which the deceleration signal $b_2$ is obtained. An output terminal of the OFF delay timer 37b is connected to the slip signal generator 36a to select the one of the two reference slip ratios set in it. The delay time of the OFF delay timers 37a and 37b is sufficiently long. When the output of the OFF delay timer 37a or 37b is "1", the smaller of the two reference slip ratios is selected in the slip signal generator 36b or 36a. And when the output of the OFF delay timer 37a or 37b is "0", the larger of the two reference slip ratios is selected in the slip signal generator 36b or 36a. Operations of this embodiment are substantially the same as those of the above embodiments.

According to this embodiment, either of the brake pressures to the front and rear wheels is not decreased, when both of the wheels are not considerably braked. The braking distance can be reduced more than that by the prior art skid control system.

Figure 9:
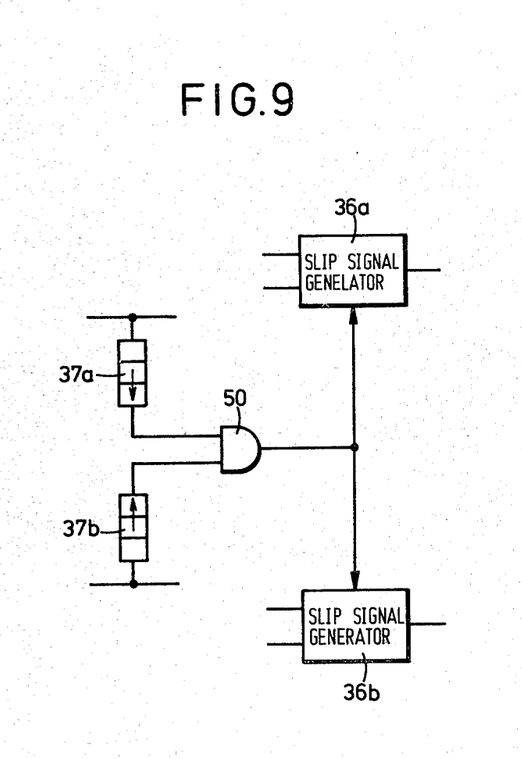
FIG. 9 is a block diagram of a part of one modification of the skid control system of FIG. 8.

FIG. 9 shows one modification of the skid control system of FIG. 8. In this modification, the output terminals of the OFF delay timers 37a and 37b are connected to input terminals of an AND gate 50. An output terminal of the AND gate 50 is connected to the slip signal generators 36a and 36b. Unless the deceleration signals $a_2$ and $b_2$ are generated from both of the acceleration/deceleration signal generators 33a and 33b, the larger of the two reference slip ratios is selected in the slip signal generators 36a and 36b. When both of the decelerations of the wheels have reached the predetermined threshold deceleration, the slip signal generators 36a and 36b are changed over into the smaller of the two reference slip ratios. The operations and effects of this modification are substantially the same as those of the first and second embodiments.

In the above-described embodiments, the common approximate vehicle speed to be supplied to the respective slip signal generators 4a, 4b and 4c, or 34a, 34b and 34c is the maximum of the outputs of the approximate vehicle speed generators 4a, 4b and 4c, or 34a, 34b and 34c which is selected by the selecting circuit 5 or 35. However, it may be formed in the manner that the maximum of the outputs of the wheel speed signal generators 2a, 2b and 2c, or 32a, 32b and 32c is supplied to a common approximate vehicle speed generator.

Further in the above-described embodiments, the two reference slip ratios (15% and 10%) as the predetermined amounts are set in the respective slip signal generators 6a, 6b and 6c, or 36a, 36b and 36c. However, two reference slip values such as 15 km/h and 10 km/h as the predetermined amounts may be set therein, instead of the two reference slip ratios.

The above-described embodiments consists of the two or three skid control circuits. However, this invention may be applied to a skid control system consisting of four skid control circuits in which wheel speed sensors are associated with four wheels, respectively.

While the preferred embodiments have been described, variations thereto will occur to those skilled in the art within the scope of the present inventive concepts which are delineated by the following claims.

What is claimed is:

1. In a skid control system for a vehicle having two or more wheels and the respective brakes for the wheels, including two or more skid control circuits, each of which comprises a wheel speed sensor for providing an output signal representative of the speed of said wheel or the mean speed of said wheels, an approximate vehicle speed generator for providing an output signal representative of the approximate speed of the vehicle on the basis of said output signal of the wheel speed sensor, a slip signal generator receiving said output signal of the wheel speed sensor, an acceleration/deceleration signal generator receiving said output signal of the wheel speed sensor, a valve control circuit receiving the outputs of said slip signal generator and acceleration/deceleration signal generator, and electromagnetic valve means receiving the output of said valve control circuit, wherein the maximum of the outputs of said approximate vehicle speed generators of the skid control circuits is supplied to the respective slip signal generators, a predetermined amount is set in said respective slip signal generators, and a slip signal for relieving the brake to the wheel is generated from said slip signal generator, when the speed of the corresponding wheel becomes lower by more than said predetermined amount than said maximum of the output of the approximate vehicle speed generators, the improvement in which a second predetermined amount is set in said respective slip signal generators, said slip signal generator generating a second slip signal, when the speed of the corresponding wheel becomes lower by more than said second predetermined amount than said maximum output of the approximate vehicle speed generators, and the larger of said first-mentioned predetermined amount and said second predetermined amount is selected in said slip signal generator of any one of said skid control circuits, until a skid signal or skid signals representative of the skid condition of the wheel or wheels is generated in the other of said skid control circuits.

2. A skid control system according to claim 1, in which said skid signal is the slip signal from said slip signal generator.

3. A skid control system according to claim 1, in which said skid signal is the deceleration signal from said acceleration/deceleration signal generator.

4. A skid control system according to claim 1, in which said skid signal is the output signal from said valve control circuit for relieving the brake to the wheel or maintain the brake at constant.

5. A skid control system according to claim 1, in which said skid control circuits further include change-over signal generators in which a predetermined third amount smaller than said predetermined first-mentioned and second amounts is set, and said maximum of the outputs of the approximate vehicle speed generators and said output signals of the wheel speed sensors are supplied to said change-over signal generators, respectively, to be compared with each other, said skid signal being generated from said change-over signal generator, when said output of the wheel speed sensor becomes lower by more than said third predetermined amount than said maximum of the outputs of the approximate vehicle speed generators.

6. A skid control system according to claim 1, in which said acceleration/deceleration signal generator, approximate vehicle speed signal generator and slip signal generator receives said output signal of the wheel speed signal generator through a wheel speed signal generator.

7. A skid control system according to claim 1, in which said electromagnetic valve means consists of inlet valve and outlet valve.

8. In a skid control system for a vehicle having two or more wheels and the respective brakes for the wheel including two or more skid control circuits, each of which comprises a wheel speed sensor for providing an output signal representative of the speed of said wheel or the mean speed of said wheels, a slip signal generator receiving said output signal of the wheel speed sensor, an acceleration/deceleration signal generator receiving said output signal of the wheel speed sensor, a valve control circuit receiving the outputs of said slip signal generator and acceleration/deceleration signal generator, and electromagnetic valve means receiving the output of said valve control circuit, wherein the maximum of the output signals of said wheel speed sensors of the skid control circuits is supplied to a common approximate vehicle speed generator for providing an output signal representative of the approximate speed of the vehicle on said maximum of the output signals of said wheel speed sensors, the output signal of said common approximate vehicle speed generator is supplied to the respective slip signal generators, a predetermined amount is set in said respective slip signal generators, and a slip signal for relieving the brake to the wheel is generated from said slip signal generator, when the speed of the corresponding wheel becomes lower by more than said predetermined amount than said output signal of the common approximate vehicle speed generator, the improvement in which a second predetermined amount is set in said respective slip signal generators, said slip signal generator generating a second slip signal, when the speed of the corresponding wheel becomes lower by more than said second predetermined amount than said output signal of the common approximate vehicle speed generator, and the larger of said first-mentioned predetermined amount and said second predetermined amount is selected in said slip signal generator of any one of said skid control circuits, until a skid signal or skid signals representative of the skid condition of the wheel or wheels is generated in the other of said skid control circuits.

9. A skid control system according to claim 8, in which said skid signal is the slip signal from said slip signal generator.

10. A skid control system according to claim 8, in which said skid signal is the deceleration signal from said acceleration/deceleration signal generator.

11. A skid control system according to claim 8, in which said skid signal is the output signal from said valve control circuit for relieving the brake to the wheel or maintain the brake at constant.

12. A skid control system according to claim 8, in which said skid control circuits further include change-over signal generators in which a predetermined third amount smaller than said predetermined first-mentioned and second amounts is set, and said output signal of the common approximate vehicle speed generator and said output signals of the wheel speed sensors are supplied to said change-over signal generators, respectively, to be compared with each other, said skid signal being generated from said change-over signal generator, when said output of the wheel speed sensor becomes lower by more than said third predetermined amount than said output signal of the common approximate vehicle speed generator.

13. A skid control system according to claim 8, in which said acceleration/deceleration signal generator and slip signal generator receives said output signal of the wheel speed sensor through a wheel speed signal generator.

14. A skid control system according to claim 8, in which said electromagnetic valve means consists of inlet valve and outlet valve.

* * * * *

UNITED STATES PATENT AND TRADEMARK OFFICE
CERTIFICATE OF CORRECTION

PATENT NO. : 4,420,191
DATED : December 13, 1983
INVENTOR(S) : Tetsuro Arikawa; Teruo Inoue It is certified that error appears in the above-identified patent and that said Letters Patent is hereby corrected as shown below:

Column 3, line 54, change "sensor" to --sensors--.

Column 4, line 5, change "and 6b." to --and 6c.--.

Column 5, line 13, change "namelythe" to --namely the--.

Column 8, line 68, change "becomes" to --become--.

Column 9, line 3, insert --the-- after "with".

Column 9, line 28, delete ";" and insert --as to-- after determined.

Column 9, line 58, change "son" to --soon--.

Column 9, line 61, delete "," .

Column 12, line 41, change "in" to --In-- .

Column 13, line 18, insert --1-- after (") and before (").

Column 13, line 40, change "becomes" to --become--.

Column 14, line 36, insert --(-- before "for" .

UNITED STATES PATENT AND TRADEMARK OFFICE
CERTIFICATE OF CORRECTION

PATENT NO. : 4,420,191

DATED : December 13, 1983

INVENTOR(S) : Tetsuro Arikawa et al.

It is certified that error appears in the above-identified patent and that said Letters Patent is hereby corrected as shown below:

Column 14, line 37, insert -- ) -- after "milliseconds".

Signed and Sealed this

Thirty-first Day of July 1984

[SEAL]

Attest:

Attesting Officer

GERALD J. MOSSINGHOFF

Commissioner of Patents and Trademarks